(12) United States Patent
Scharr

(10) Patent No.: US 10,619,353 B1
(45) Date of Patent: Apr. 14, 2020

(54) INTEGRATED WALL ASSEMBLY

(71) Applicant: Metal Sales & Service, Inc., Kennett Square, PA (US)

(72) Inventor: Stephen J. Scharr, Kennett Square, PA (US)

( * ) Notice: Subject to any disclaimer, the term of this patent is extended or adjusted under 35 U.S.C. 154(b) by 0 days.

(21) Appl. No.: 15/420,031

(22) Filed: Jan. 30, 2017

Related U.S. Application Data

(60) Provisional application No. 62/388,418, filed on Jan. 29, 2016.

(51) Int. Cl.
| | |
|---|---|
| *B44F 7/00* | (2006.01) |
| *E04F 13/08* | (2006.01) |
| *E04F 13/074* | (2006.01) |
| *E04F 13/072* | (2006.01) |
| *E04F 13/12* | (2006.01) |
| *A01G 9/20* | (2006.01) |

(Continued)

(52) U.S. Cl.
CPC .......... *E04F 13/0803* (2013.01); *A01G 9/02* (2013.01); *A01G 9/20* (2013.01); *A01G 27/00* (2013.01); *E04F 13/072* (2013.01); *E04F 13/074* (2013.01); *E04F 13/0871* (2013.01); *E04F 13/12* (2013.01)

(58) Field of Classification Search
CPC ........ E04F 13/08; E04F 13/12; E04F 13/0837
USPC .... 52/745.08, 762, 459, 460, 474, 477, 602, 52/506.01, 506.03, 475.1, 220.1, 220.2, 52/220.4, 220.5, 314, 309.4
See application file for complete search history.

(56) References Cited

U.S. PATENT DOCUMENTS 4,507,900 A * 4/1985 Landis ............... E04B 5/48
174/484
4,973,506 A * 11/1990 Bauer ............... B32B 3/12
428/73

(Continued)

FOREIGN PATENT DOCUMENTS

CN 102677960 4/2012
CN 104813861 5/2015

(Continued)

OTHER PUBLICATIONS

Modulogreen Vertical Solutions. Nov. 27, 2013, www.modulogreen.com/modulo/index.en.pnp.

(Continued)

*Primary Examiner* — Chi Q Nguyen
(74) *Attorney, Agent, or Firm* — Ramberg IP, LLC; Jeffrey R. Ramberg

(57) ABSTRACT

An article featuring a cladding system for a wall, the cladding system including:
(a) a plurality of metal structural members connected together to form a rigid substrate having a front surface, and a rear surface in a spaced-apart relationship and parallel to the front surface;
(b) an architectural facade featuring metal plate shaped in three dimensions;
(c) a module of defined height and width featuring the architectural facade attached to the rigid substrate, and further featuring means for attachment of the module to the wall;
(d) the module further characterized in that placing a plurality of modules adjacent and above or below one another forms a repeating pattern of the three-dimensionally shaped metal plate of the architectural facade.

20 Claims, 10 Drawing Sheets

(51) Int. Cl.
*A01G 27/00* (2006.01)
*A01G 9/02* (2018.01)

(56) References Cited

U.S. PATENT DOCUMENTS

| | | | | |
|---|---|---|---|---|
| 5,184,439 | A * | 2/1993 | Ward | E04C 2/38 |
| | | | | 52/223.6 |
| 5,632,126 | A * | 5/1997 | Agsten | E04B 2/8635 |
| | | | | 52/106 |
| 5,704,170 | A * | 1/1998 | Simpson | E04B 7/024 |
| | | | | 52/22 |
| 7,191,570 | B1 * | 3/2007 | Eaton | E04B 9/22 |
| | | | | 52/465 |
| 7,752,818 | B1 * | 7/2010 | Roegge | E04F 13/0814 |
| | | | | 52/235 |
| 7,770,354 | B2 * | 8/2010 | Bui | E04C 2/06 |
| | | | | 52/579 |
| 8,281,517 | B2 | 10/2012 | MacKenzie | |
| D693,483 | S | 11/2013 | Krieger | |
| 2007/0137128 | A1 * | 6/2007 | Viau | B44C 5/0415 |
| | | | | 52/388 |
| 2008/0053012 | A1 * | 3/2008 | Scanlan | E04G 21/1866 |
| | | | | 52/204.2 |
| 2009/0288358 | A1 * | 11/2009 | Snyder | E04B 2/58 |
| | | | | 52/302.1 |
| 2010/0011688 | A1 * | 1/2010 | Moran | E04F 13/0803 |
| | | | | 52/250 |
| 2011/0016784 | A1 | 1/2011 | Taber | |
| 2011/0107667 | A1 | 5/2011 | Laurence | |
| 2012/0042587 | A1 * | 2/2012 | Reid | E04F 13/0837 |
| | | | | 52/173.1 |
| 2012/0227320 | A1 | 9/2012 | Dos Santos | |
| 2013/0061546 | A1 * | 3/2013 | Johnson | E04C 2/22 |
| | | | | 52/387 |
| 2013/0104472 | A1 * | 5/2013 | Carolan | E04B 2/90 |
| | | | | 52/204.1 |
| 2015/0096251 | A1 * | 4/2015 | McCandless | E04F 13/0807 |
| | | | | 52/404.3 |
| 2015/0107173 | A1 * | 4/2015 | Ku | E04F 13/0816 |
| | | | | 52/235 |
| 2015/0240475 | A1 * | 8/2015 | Malakauskas | E04B 1/34838 |
| | | | | 52/79.13 |
| 2015/0315796 | A1 * | 11/2015 | Hall | E04F 13/075 |
| | | | | 52/316 |
| 2016/0040425 | A1 * | 2/2016 | Farahmandpour | E04F 13/00 |
| | | | | 52/235 |

FOREIGN PATENT DOCUMENTS

| | | |
|---|---|---|
| DE | 3803121 | 2/1988 |
| DE | 1953164 | 8/1995 |
| DE | 002873620-0008 | 11/2015 |
| EP | 2335473 | 12/2010 |
| EP | 2856859 | 10/2014 |
| JP | 2014064558 | 8/2013 |
| KR | 20140020021 | 8/2012 |
| KR | 20140003163 | 11/2012 |
| KR | 20160034615 | 9/2014 |
| SE | 000770342-0001 | 8/2007 |
| WO | WO 2009095561 | 11/2008 |
| WO | WO 2009127762 | 3/2009 |
| WO | WO 2016142283 | 3/2016 |

OTHER PUBLICATIONS

Greenwall DIY kit system, Jul. 1, 2016, www.verticalgardensnow.com.au/greenwall-singlsided/.
Green Wall Systems, Aug. 1, 2016, www.marklaurence.com/living_walls/green_wall_systems.html.

* cited by examiner

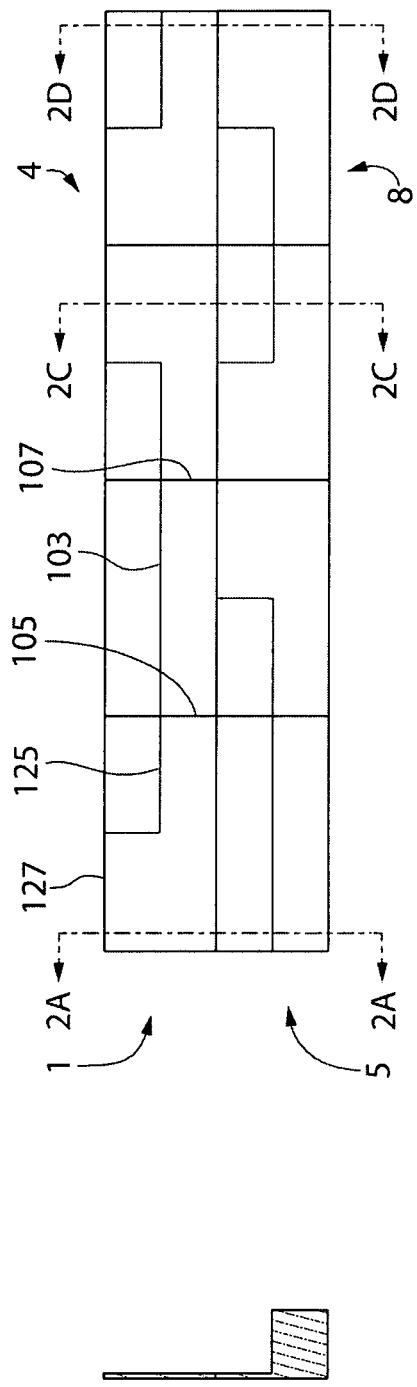
FIG. 2B
FIG. 2C
FIG. 2D
FIG. 2A

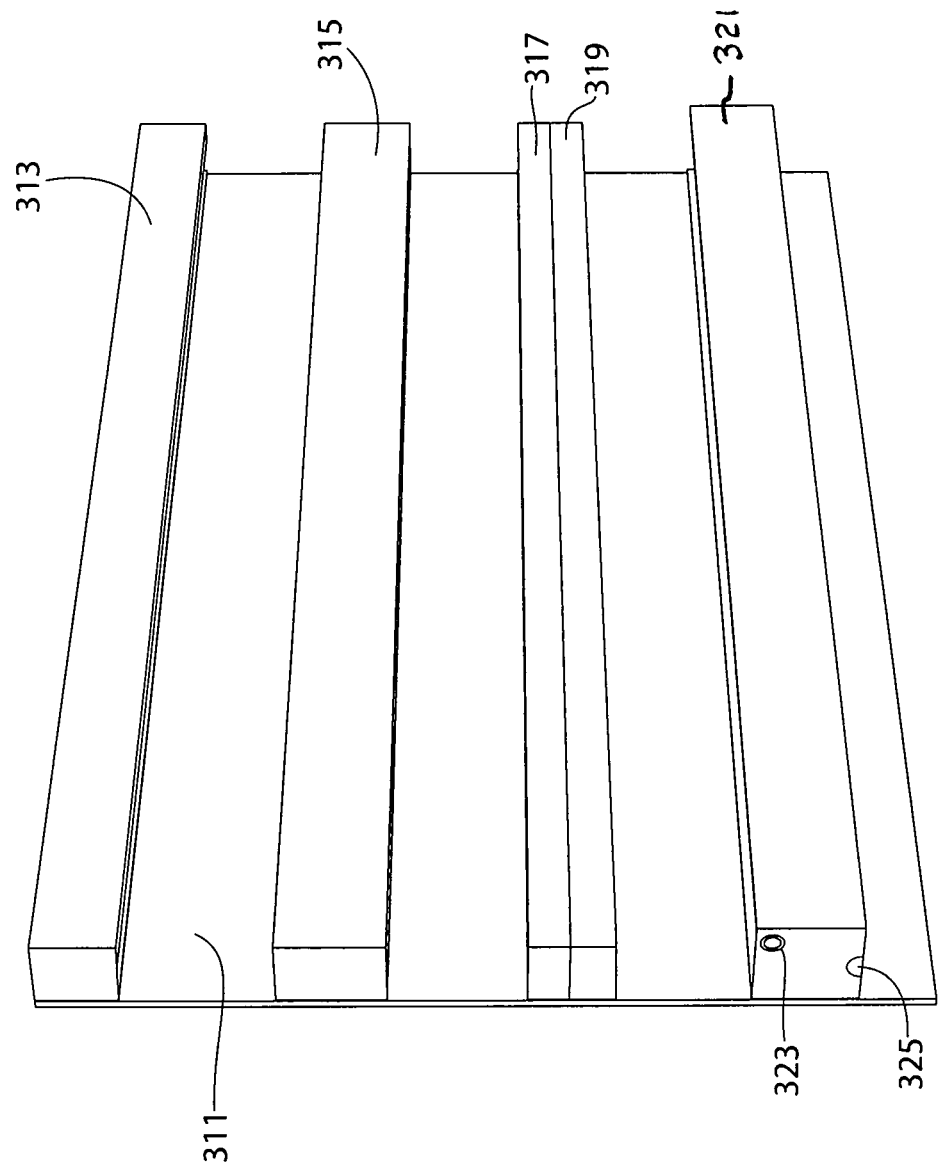
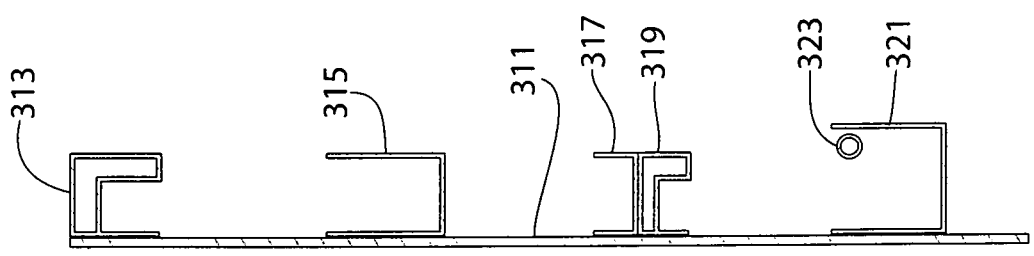
FIG. 3B
FIG. 3A

INTEGRATED WALL ASSEMBLY

CROSS-REFERENCE TO RELATED APPLICATION

This patent document claims the benefit of U.S. Provisional Patent Application Ser. No. 62/388,418, filed on Jan. 29, 2016. The entire contents of this commonly owned patent application is expressly incorporated by reference herein.

STATEMENT REGARDING FEDERALLY SPONSORED RESEARCH

None.

BACKGROUND OF THE INVENTION

1. Field of the Invention

The instant invention relates to wall cladding systems configured to form an interior or exterior wall of a building or other structure.

2. Discussion of Related Art

Obviously, among the functions or purposes of a building is to provide its occupants with a controlled and controllable environment that is comfortable. This implies keeping out heat, cold, rain, wind and air contaminants such as dust. The exterior surfaces of a building, sometimes referred interchangeably as the skin, envelope, or facade of the building, can be weatherproofed in two basic ways: by means of a barrier wall, or by means of a rain screen. The former involves keeping out the elements by means of gaskets and sealants such as caulking. The latter, "rain screen", involves installing a covering, or "cladding", typically opaque, over non-vision, non-egress areas of the building. Examples of cladding include brick facing, precast concrete, fiber cement siding, and metal panels.

Some of the wall cladding system s of the prior art also incorporate the concept of "green" or "living" walls; that is, wall cladding systems that incorporate living plants. But these green wall systems are designed to attach to existing building envelopes. They are not designed to function as a sole, or original, envelope or skin for a building.

Wall cladding systems per se are not new. One purpose or function of such systems is to provide a decorative element to an otherwise plain interior or exterior wall. In fact, the means for attaching such wall cladding systems to the wall is fairly well standardized, for example, the so-called ARCWALL attachment system, to be discussed in further detail below.

However, much about these wall cladding systems has not been standardized. It is common for a great deal of work to remain after the cladding system has been installed. For example, lighting or signage may need to be installed onto or into the wall, along with the required electrical wire or cable. The wall cladding may need to be painted or otherwise coated to protect it from the elements.

The instant invention addresses these and other shortcomings in the known art.

SUMMARY OF THE INVENTION

What is provided in accordance with the instant invention is a pre-assembled, pre-fabricated, integrated wall cladding module, the module including:

(a) plate metal shaped in three dimensions, and attached to a plurality of structural support elements;
(b) means for attaching said module to another identical module placed vertically or laterally with respect to said module, and means for attaching said module to a wall of a structure, and wherein
(c) the three-dimensional shape forms a pattern that repeats at least in a vertical direction.

The instant integrated wall cladding module may be used as either an exterior or interior architectural wall surface where the designer wants to highlight the façade with three-dimensional textures.

The instant wall cladding system has the ability to integrate fully supported planter boxes with modular irrigation, which irrigation can be provided only where it is needed.

The instant wall cladding system has the ability to integrate lighting features with wiring into fully assembled modular units.

BRIEF DESCRIPTION OF THE FIGURES

FIGS. 2A-2D are left side, front, cross-sectional and right side views, respectively, of the Ribbon 3-D architecture;

FIGS. 3A and 3B are cross-sectional and perspective views, respectively, of the Minimal 3-D architecture;

All of the figures except FIG. 7 are according to the instant invention; FIG. 7 is part of the prior art.

DETAILED DESCRIPTION OF EMBODIMENTS OF THE INVENTION

Figure 1:
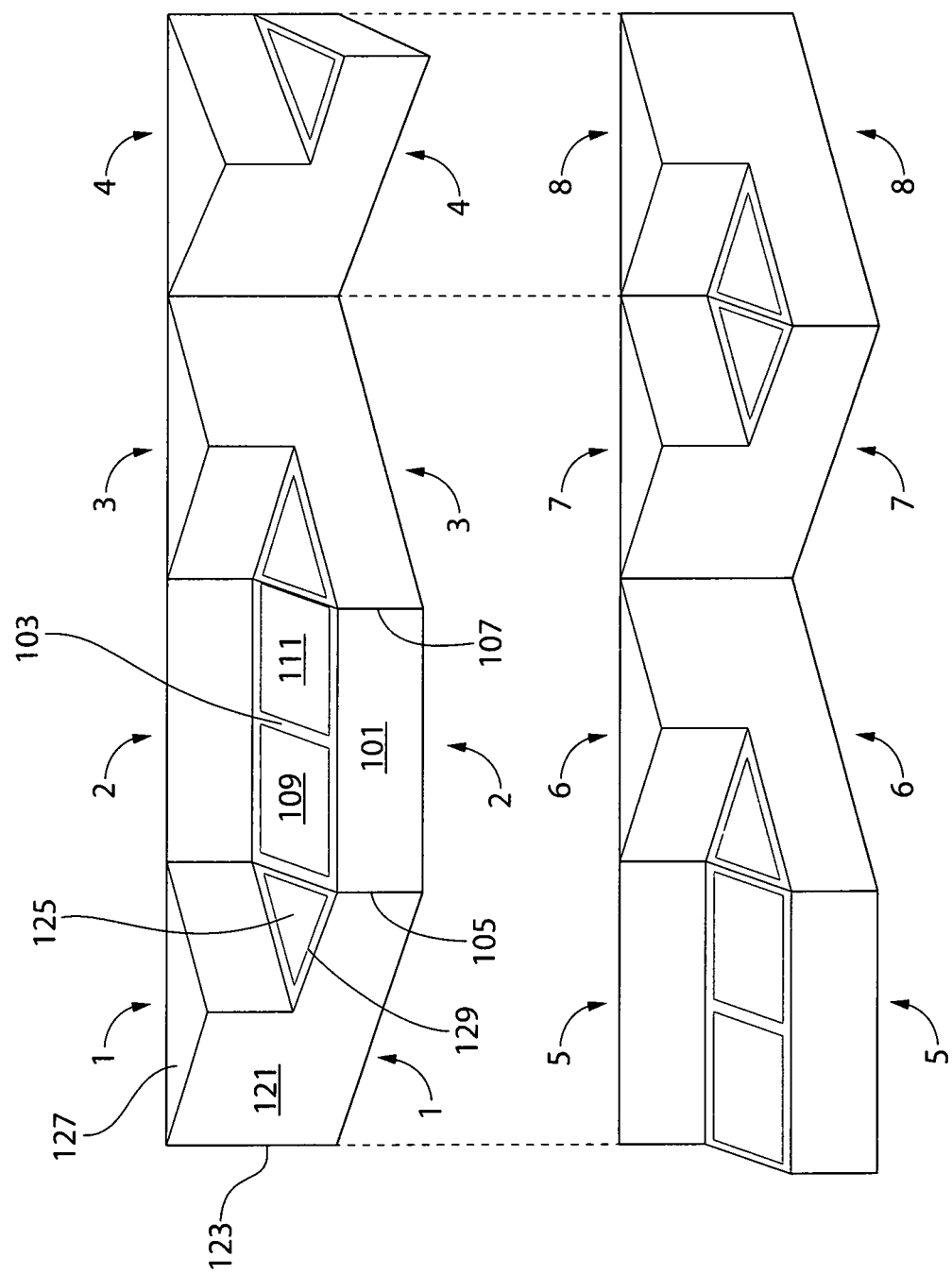
FIG. 1 is an exploded isometric view of the Ribbon integrated wall cladding architecture.

The primary function of the instant integrated wall cladding module is to permit design professionals the freedom to create their own signature design on the building to communicate the mission for the client, provide a platform from which to achieve functional or design tasks such as lighting or greening a wall surface, or to create an iconic symbol for a community. It is used as either an exterior or interior architectural wall surface where the designer wants to highlight the façade with three-dimensional textures. When illuminated from a source of light (as opposed to indirect ambient lighting), the three-dimensional texture creates unique shadow patterns. The instant wall cladding module can be customized at the factory per the customer's wishes to incorporate custom designed patterns using any combination of formed metal, perforated metal sheet, woven wire mesh, translucent panels or integrated green wall cladding. Other optional customization includes provision for artificial lighting, or optional openings for planters that contain plants, including live plants.

This metal wall cladding or feature wall is available finished with architectural grade liquid or powder coated Kynar® anodized aluminum finishes (generically called "polyvinylidene fluoride" or PVDF), natural, polished or mechanically etched stainless steel, or zinc. Other coatings include polytetrafluoroethylene (PTFE) and paint such as an automotive finish.

The wall cladding is provided with integrally designed support systems and can be unitized for attachment to any concrete, steel, stud or CMU backed wall structure. It can be integrated with other more generic ARCWALL design systems to create a unified exterior or interior wall surface design. For example, the customer may only want a single wall, or even only a portion of one wall, to feature the profiled or three-dimensional architecture of the instant cladding material. The other exterior walls of the building, or the portion of the one wall outside or inside of the profiled portion, may remain as the non-profiled, generic ARCWALL design system. Further, the profiled architecture of the instant wall cladding system can be formed or shaped such that there is a smooth transition from the non-profiled region(s) of a building to the profiled region(s).

Again, the integrated wall cladding panels of the instant invention may attach to a substrate using the standard ARCWALL attachment method. A typical assembly shipped from the factory consists of about two to three panels arranged above one another, that is, vertically. Not only are the panels attached to a substrate or support surface, they are attached to one another in an interlocking fashion, such as shown by J-hook 625 in FIG. 6.

One of the prior art patent publications directed to a "green wall" states that such green walls by their very nature, inherently function as rain screens. To a degree, this is true, at least in the sense that the sheet of metal behind the plants will prevent the majority of rain from striking the wall of the building. However, the instant Applicant would not consider such to be adequate, or an adequate rain screen.

When used as a rain screen, the instant integrated wall cladding is considered a part of the building enclosure and must perform critical weather resistant functions.

First, it acts as the building enclosure's outer leaf and primary moisture resistance barrier against rain, ice and snow. This outer leaf sheds moisture that contacts the exterior of the building and through a series of integrated horizontal channels, flashing and vertical gutters, the bulk of the moisture is arrested from entering the building and channeled back to the exterior and to the ground or roof below the wall. There is also a necessary air space that will vent pressure so as to resist capillary action, which might otherwise create a suction effect, drawing moisture towards the interior spaces where the ambient pressure may be less than the exterior. This air space also promotes drying out after a rain or snow event. See FIG. 6 for the components arranged for a typical rain screen wall assembly, and discussed in greater detail below.

Second, the instant integrated wall cladding provides air barrier protection. In most rain screen system applications, the moisture resistant air barrier (commonly called air vapor barriers or "AVB") is installed/adhered over the exterior structural wall supports (commonly studs and sheathing or masonry block), and prevents wind-blown moisture-laden air from penetrating into the interior spaces.

Third, the instant integrated wall cladding provides thermal layer protection. The exterior rain screen cladding system prevents a majority of the exterior elements from damaging the insulation that is commonly placed on the outside face of the air barrier and behind the rain screen layer.

Fourth, the instant integrated wall cladding acts as a durable wind resistance barrier protecting the building contents and occupants from exterior wind pressures, both positive and negative, as well as from airborne debris, in the event of a severe storm. More generally, it protects the building's thermal and air infiltration layers from damage caused by wind, rain and solar forces, which would diminish or degrade the insulation's thermal resistance properties.

EXAMPLES

The following non-limiting examples illustrate three different embodiments of the instant invention.

"Ribbon": This embodiment of the instant integrated wall cladding system features a horizontally oriented basket weave pattern. The openings for planter or lighting troughs are optional. This product is offered as an open weave or solid.

"Minimal": In this embodiment, metal plate shaped as a trough is attached to a metal plate backing layer. The lengthwise, or longitudinal axis, of the troughs may be oriented vertically or horizontally with respect to the upper or top edge of the plate metal backing layer. The trough assemblies can also be applied on diagonals independently with panel joints if desired.

"Parametric": This embodiment features a unique sloping and tapering style of panel, which allows the designer to create custom transverse score patterns across the façade. Pattern cut holes, graphics, letters or logos are optional, and are factory cut into the panel faces. The holes can be sized for planters or backlighting features. This product can also have factory installed wire mesh or translucent lenses behind the openings.

The three-dimensional shape of this panel includes (i) a flat panel or portion that slopes out or away from the plurality of support elements as one moves vertically down said flat panel, and (ii) a flat panel or portion that slopes inward or toward the plurality of support elements as one moves vertically down said flat panel. At least one of said flat panels or portions tapers in a horizontal direction. Preferably, each of said flat panels or portions tapers in a horizontal, but opposite, direction.

Referring now to FIGS. 1 and 2, the "Ribbon" three-dimensional wall cladding system, and particularly its pattern, will be described in further detail.

FIG. 1 is an exploded isometric view of the Ribbon architecture. It can be thought of as four segments, 1-4, lying directly above another four segments 5-8, as seen by the front view of FIG. 2. In each segment, the top surface is parallel to the bottom surface, and side edges are at right angles to the top and bottom surfaces.

Beginning first with segment 2, front surface 101 is parallel to the rear surface. About halfway up from the bottom surface, the segment is "notched" to form a rectangular "shelf" 103 that extends all the way from the front to the rear surface, and all the way from the left side 105 to the right side 107 of the segment. The top surface of the shelf is parallel to the top and bottom surfaces of the segment. The shelf may be enclosed or open. If the latter, the open space may be used to house one or more planter boxes; here, two rectangular planter boxes 109, 111 are shown.

Turning now to segment 1, a top view shows the segment as being wedge- or triangular-shaped, with the front surface 121 meeting the rear surface at the left edge 123. This segment also has been "notched" about halfway up from the bottom surface, but only from the middle out to the right side, thereby creating a shelf 125 in the shape of a right triangle. The notch leaves top surface 127 in the shape (top view) of an isosceles triangle. The triangular shaped shelf 125 of segment 1 is at the same elevation and in the same plane as the rectangular shelf 103 of segment 2. As with rectangular shelf 103, the triangular shelf 125 may be open or closed. If open, a triangular-shaped planter box 129 may fit in this space.

Segment 3 is a mirror image of segment 1, but otherwise identical.

Segment 4 is identical to segment 1.

Referring now to the bottom four segments 5-8, one can see that segment 5 is identical to segment 2, segment 6 is identical to segment 3, segment 7 is identical to segment 4, and segment 8 is identical to segments 6 and 3. Thus, one can see that the Ribbon design features only three unique segment shapes. One can also see that the sequence of segments for the bottom "layer" is the same as the sequence for the upper layer, except that the "start" of the sequence is shifted to the right by one segment. This also means that the next segment in the upper layer or row, continuing to the right, would be another segment 3, and the next one after that would be another segment 1. Thus, each row repeats after five segments, with the upper row exhibiting a cycle of segments 1-2-3-4-3, and the bottom row having the cycle of segments 5-6-7-8-7.

The "Minimal" three-dimensional wall cladding system, and particularly its pattern, will now be described in further detail with reference to FIGS. 3A and 3B.

Referring first to FIG. 3B, what is shown is a perspective view of the Minimal three-dimensional (sometimes referred to as "3-D") architecture, featuring a plurality of right rectangular prisms 313, 315, 317, 319, 321 attached to a flat panel 311. Thus, the right and view of the prisms is identical to the left view (shown), except being a mirror image. FIG. 3A is a cross-sectional view of a vertical section taken through the article of FIG. 3A. The cross-sectional view shows that prisms 315, 317 and 321 are hollow, with cavities that open upward, and that prisms 313 and 319 are hollow, with cavities that open in a downward direction. Lighting may be installed in these downward facing cavities. The prisms having upward-facing cavities, particularly prisms 315 and 321 may serve as planters for plants, particularly live plants. Note that the bottom-most prism 321 may be slightly larger (deeper) than the other prisms. This prism is also depicted as having an irrigation hose, pipe or tube 323 for providing water to live plants (not shown). Drip or weep hole 325 provides for drainage for excess water.

The "Parametric" three-dimensional design for the wall cladding system, and particularly its pattern, will now be further described with reference to FIGS. 4 and 5A-5C.

Figure 4:
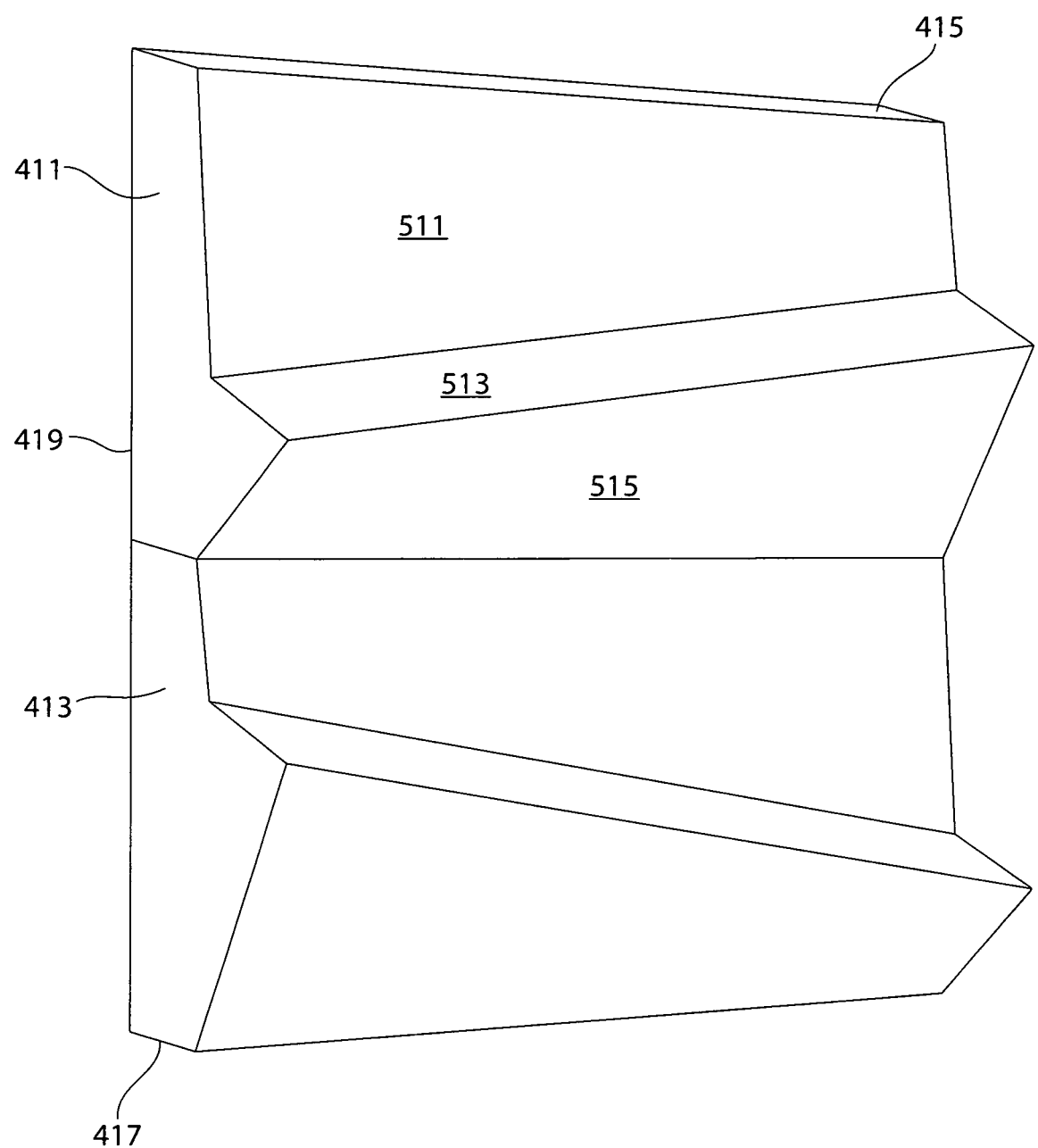
FIG. 4 is an isometric view showing mostly the front and left side surfaces of a "module" or unit of the Parametric 3-D design architecture.
Figure 5C:
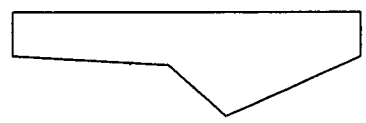
FIGS. 5A, 5B and 5C are left, front and right views of the upper subunit.
Figure 5B:
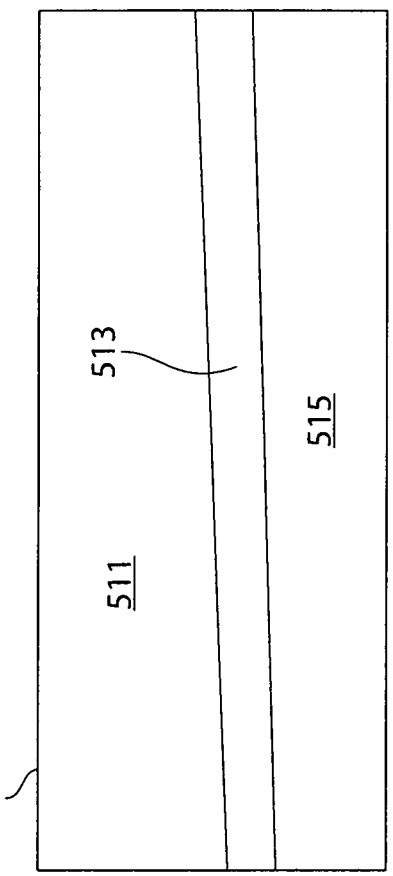
Figure 5A:
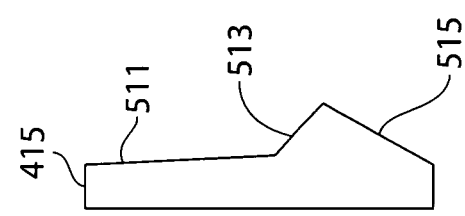
Figure 5F:
FIGS. 5D, 5E and 5F are left, front and right end views of the lower subunit of the Parametric design.
Figure 5E:
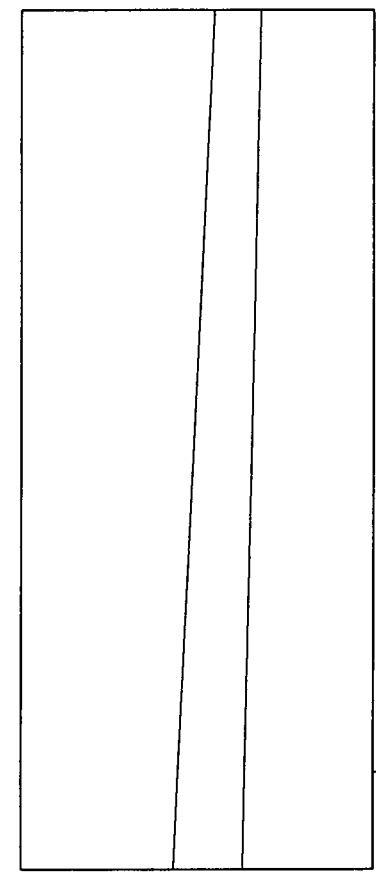
Figure 5D:
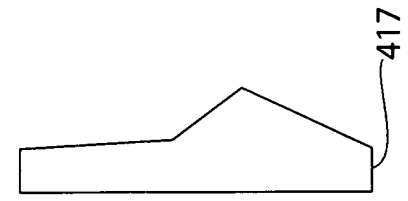

FIG. 4 is an isometric view showing mostly the front and left side surfaces of a "module" or unit of the Parametric design, featuring an upper subunit 411 and a lower subunit 413. Top 415 and bottom 417 surfaces are roughly normal to back surface 419. FIGS. 5A, 5B and 5C are left, front and right views of the upper subunit, and FIGS. 5D, 5E and 5F are left, front and right end views of the lower subunit. Inspection of FIG. 5 shows that FIG. 5F is a mirror image of FIG. 5A, and FIG. 5D is a mirror image of FIG. 5C. The upper and lower subunits display 180 degree rotational symmetry with respect to one another: rotating either one 180 degrees around an axis that is normal to the back surface yields the shape of the other. Thus, it should be sufficient to describe the shape of either one of the subunits.

The front of the upper subunit features three planar surfaces. Surface 511 makes a narrow angle with respect to the plane of the back surface. Surfaces 513 and 515 make larger angles with respect to the plane of the back surface. Surface 513 intersects both surface 511 and surface 515; that is, it is in the middle, and forms something of a "tilted shelf". Holes for planter pots may be placed in this tilted surface, as will be described in more detail later. The middle surface also rises in elevation as one moves from left to right along the upper subunit.

This pattern can be extended vertically by placing another identical set of upper and lower subunits above the two depicted in FIG. 4. The pattern can be extended laterally to the right by placing the lower subunit adjacent the upper subunit, and by placing another copy of the upper subunit adjacent the lower subunit.

A Modular, Integrated System

Instead of troughs for plants being bolted to the flat metal architectural panels of a traditional ARCWALL cladding system, or any other wall cladding system, the three-dimensional wall cladding panels of the instant invention are integrated with the ARCWALL attachment system, and made modular. This provides a number of advantages, to be discussed in greater detail below.

This integrated, modular system will now be discussed with references to FIGS. 6 and 7, which are side, cross-sectional views, of an embodiment of the instant invention, and that of the prior art ARCWALL cladding system, respectively.

Figure 6:
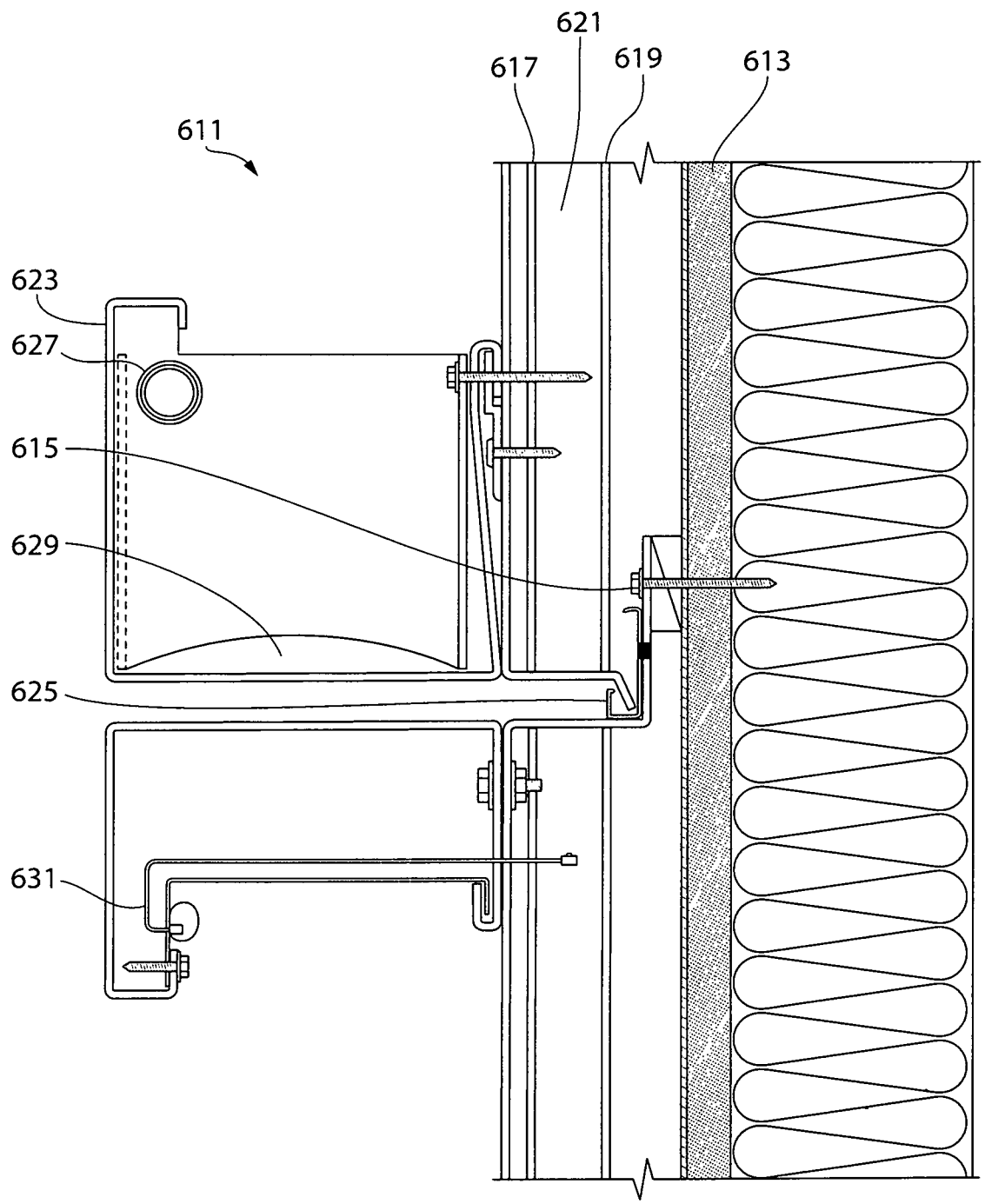
FIGS. 6 and 7 are side, cross-sectional views, of an embodiment of the instant invention, and that of the prior art ARCWALL cladding system, respectively.

The wall cladding system depicted in FIG. 6 is that of the "Minimal" system 611 attached to a wall, or at least the mounting studs for a wall 613, attached by means of fastener 615. What is most proximate the wall when the system is installed is a plurality or array of structural members such as beams that are attached to one another to form a rigid, generally planar substrate having a front surface 617 and a rear surface 619 that are parallel to one another. The space 621 between these surfaces may be filled with thermal insulation, and the rear surface may be covered with an air/water barrier. Three-dimensional plate metal facade in the form of a planter box 623 is attached to the front surface 617 of substrate. Water for the plants of the planter may be provided by irrigation tube, hose or pipe 627, with excess water draining out of drainage hole 629. Lighting for plant growth may be provided by optional internal illumination 631.

The 3-D architectural facade and substrate are provided in the form of a module having a defined height and width. A plurality of such modules are mounted adjacent one another, vertically and/or laterally, until the desired amount of coverage of the wall has been achieved. A hooking mechanism, such as a J-hook 625, can be used to help attach adjacent modules in the vertical direction. The modules may also be attached to one another in the lateral direction, for example, by means of brackets or angle iron. The modules generally and typically are arranged such that the 3-D architectural facade forms a repeating pattern at least in a vertical direction. The pattern may also repeat in the lateral direction. The pattern may repeat with every module, or it may require moving vertically or laterally across several modules before the pattern repeats.

Figure 7:
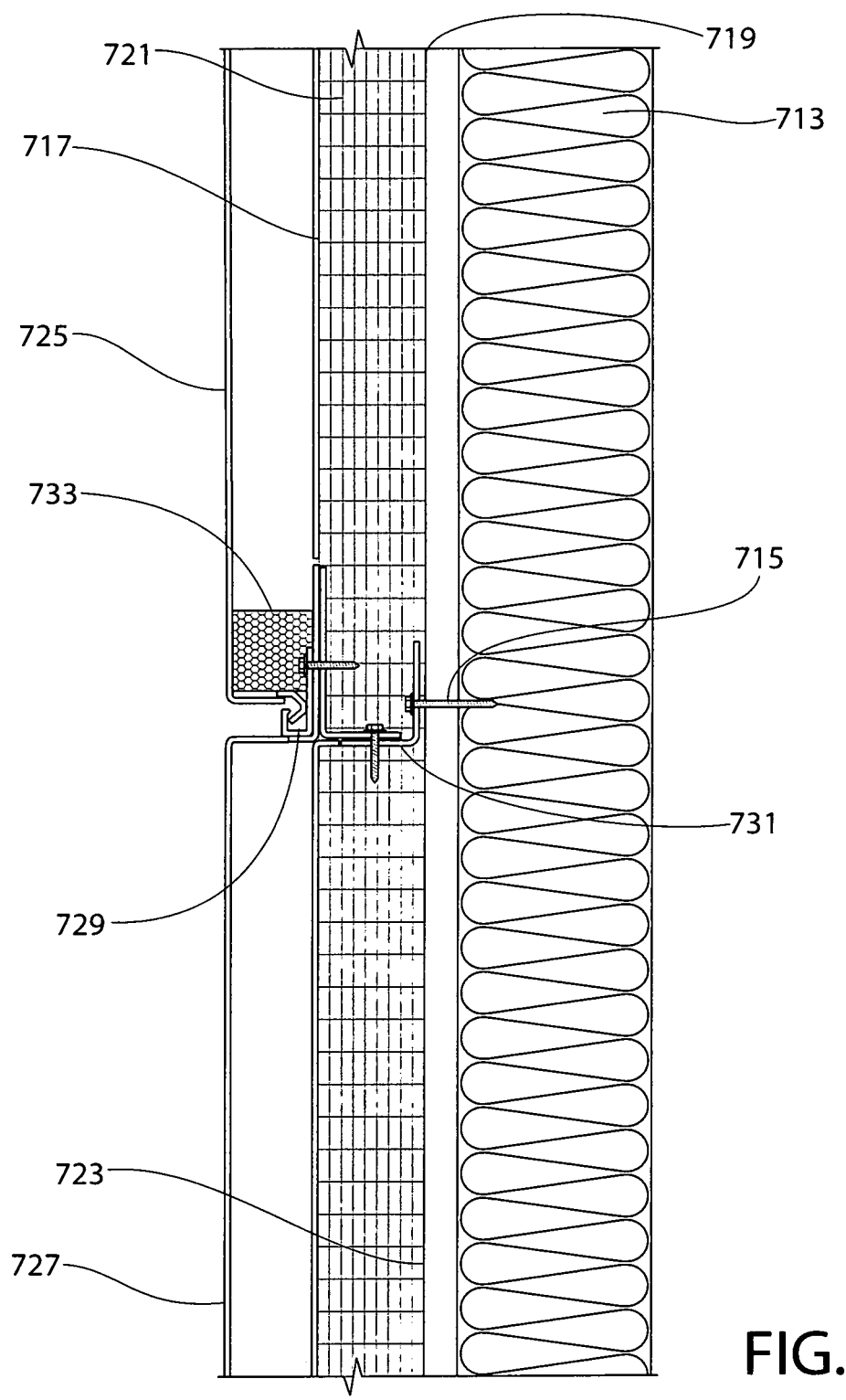

In contrast to the modular, integrated design of the instant invention is the traditional wall cladding system of the prior art, depicted in cross-section in FIG. 7. Here, flat metal panels 725, 727 are attached to a wall, or at least the mounting studs for a wall 713, attached by means of fastener 715. More specifically, the attachment is by means of the ARCWALL attachment system, wherein the metal panels are attached to a substrate, and the substrate is attached to the wall. The substrate includes a grid or array of structural members (e.g., extruded aluminum) arranged at right angles and attached to one another in a plane. The structural members may be referred to as "gutters", "trusses", or "beams" and are typically oriented horizontally and vertically. Beams that are diagonal to the vertical and horizontal structural members may also be included for additional lateral rigidity. The rigid substrate is generally planar and features a front surface 717 and a rear surface 719 that are parallel to one another. The space between these surfaces may be filled with thermal insulation 721, and the rear surface may be covered with an air/water barrier 723. Two-dimensional, flat, plate metal facade in the form of flat panels 725, 727 are attached to the front surface 717 of substrate. The attachment may be by means of metal right-angle brackets or U-shaped brackets 731. The attachment of the panels to one another may be facilitated by a hook or latch mechanism such as J-hook 729.

As with the structural members, the flat metal panels also define a plane, and this plane is parallel to that of the structural member substrate to which the metal panels are attached.

Water such as rain water, can drain through gaps in the J-hook structure after passing through filter foam 733. Although the flat panels 725, 727 may be provided in modular form, the substrate of structural members is not modular, so this wall cladding system cannot be said to be integrated. Further, when this type of wall cladding system is modified to form a three-dimensional facade, the 3-D architectural elements are simply attached to the exterior surface of the flat panels.

The "Green Wall"

The integrated wall assembly of the instant invention can incorporate living plants to form a "green wall" or "living wall". The instant integrated wall assembly can accommodate the water and light needs of the plants, as well. Plants are beneficial, among other reasons, because they are aesthetically pleasing to look at, they absorb carbon dioxide and give off oxygen, and they reduce rainfall run-off.

Figure 8A:
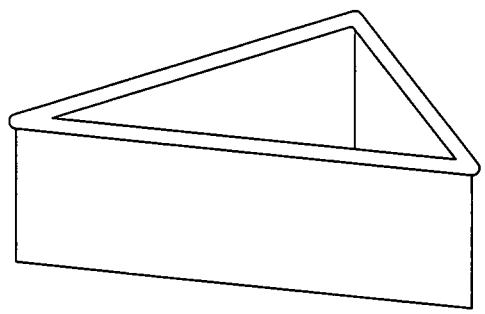
FIGS. 8A and 8B are elevated perspective views of triangular and rectangular planters appropriate for the "Ribbon" integrated wall assembly.
Figure 8B:
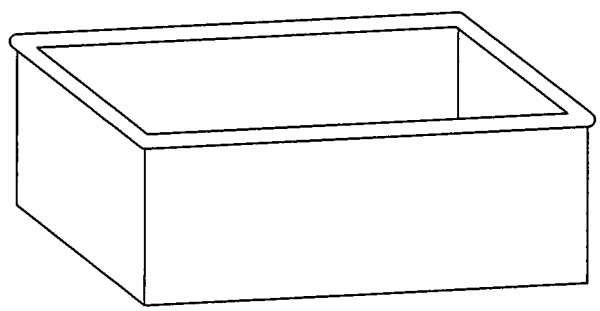
Figure 9:
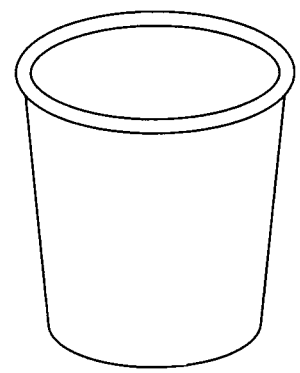
FIG. 9 is an elevated perspective view of a pot-shaped planter that can be used with the "Parametric" integrated wall assembly.
Figure 10:
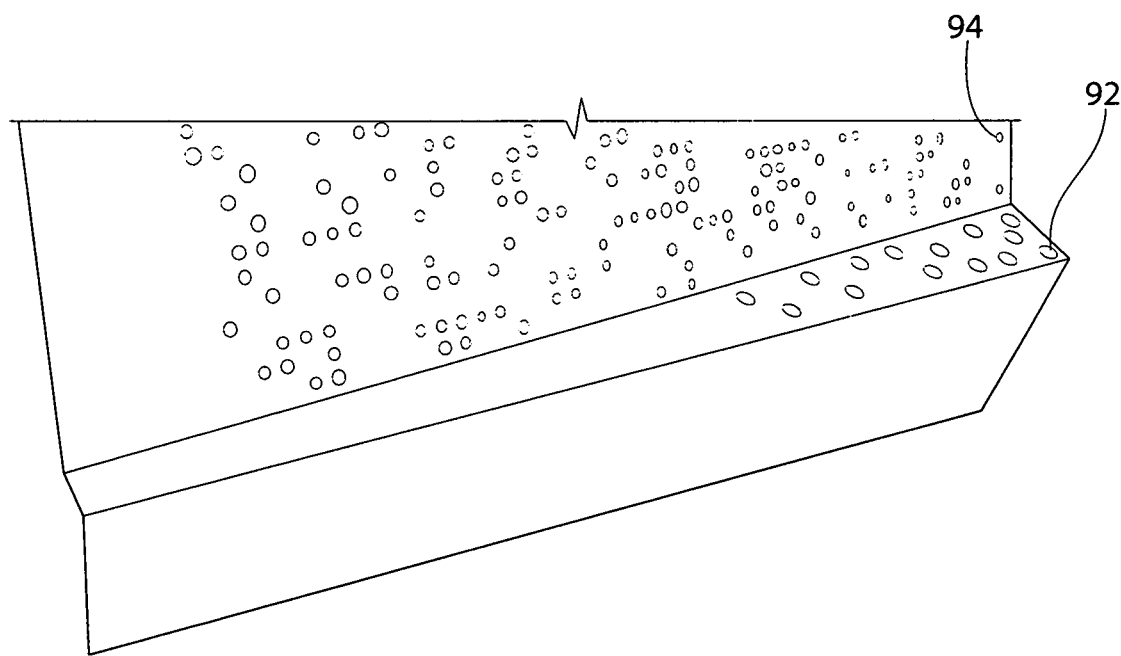
FIG. 10 is an elevated perspective view of the top and front of the basic unit of the Parametric integrated wall cladding.

The plants can be planted in separable, removable planting boxes or tray ("planters"). When the trough of the "Minimal" design is oriented horizontally at least, the plants may be planted in soil or other plant growing media that is placed directly into the cavity created by this particular design. FIGS. 8A and 8B show two shapes of planter boxes suitable for the "Ribbon" wall cladding system, and FIG. 9 shows a shape of a planter pot suitable for the "Parametric" design. The hole 92 shown in FIG. 10 is sized to accommodate such a planter pot.

In one embodiment, the plants are selected based upon local growing conditions, for example, availability of natural sunlight and water (e.g., rain). However, the instant integrated wall assembly allows the local growing conditions to be enhanced somewhat, permitting a wider variety of plants to be grown. For example, it is at least conceivable to use artificial light for some or most of the plant's need for light. The instant wall assembly accommodates artificial lights and electricity supply, e.g., wiring. This can be useful where the instant wall assembly is used indoors, or where an exterior wall may be shaded, for example, by proximity to an adjacent building.

In addition, natural rainfall can be supplemented with an irrigation system. Specifically, the sides and internal bulkheads of the instant integrated wall assembly are provided with "knock-outs" in the plate metal; that is, perforated areas shaped as a hole, for example. These perforated regions can be readily popped out with low force hammer blows, leaving a hole of the desired shape so that tubes, hoses or pipes (for example, lead line 323 in FIG. 3B) for carrying the irrigation water can be placed through the holes for the purpose of distributing water to the plants. One or more moisture sensors may be placed in the soil or other growing media, and arranged to signal when the soil has enough water, and to shut off continued flow of water. Shutting off the continued flow of water may involve shutting off a pump, or closing a valve. Weep holes 325 are provided at least at the left and right sides of a wall assembly, and optionally at additional locations, to permit excess water to drain from the planters.

The irrigation lines are shop assembled into the rear panel cavities with interconnecting fittings, which creates an array connecting the water lines in a vertical or horizontal run(s) to the planted areas of the walls from the water collection source. Sequential installation of the panels and connection of irrigation lines is performed in one single phase of installation.

Figure 11:
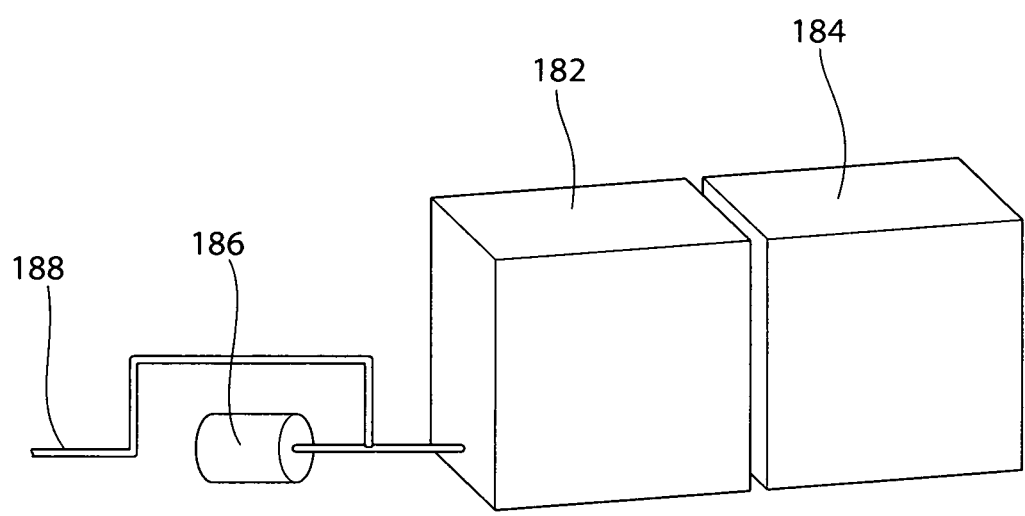
FIG. 11 is a photograph showing a pair of rainwater cisterns, a pump, and irrigation piping.

Still further, rather than using water from the local water utility, a savings can be realized by using so-called gray water. An example of gray water is rainwater that is collected and stored. This practice also has the benefit of reducing the amount of rainwater that runs onto the ground and into a storm sewer. In its simplest form, and referring to FIG. 11, one or more tanks or cisterns 182, 184 are provided at ground level for collecting and storing the water from a rainfall that runs into a gutter of the building. The collected water then may be pushed through an irrigation hose or pipe 188 by means of pump 186. However, if the building to which the instant integrated wall assembly is attached is taller than a certain height, it may be too technically difficult and costly to pump water from the ground up to where it is needed by plants. In this case, it may be preferred to place the storage tank at a higher elevation, for example, at a dedicated location inside the building. The rainfall storage could be distributed over multiple storage tanks, which could be placed at multiple locations, e.g., on multiple floors of the building.

Traditionally, a wall was made "green" by erecting a non-green wall, and then modifying that with plants and infrastructure such as an irrigation system. By contrast, the instant integrated wall assembly is made "green", if such is desired by the customer, at the factory. What is installed at the job site, then, is a sub-assembly already containing the irrigation system. If the customer wants lighting for the wall, that, too, is integrated or pre-assembled at the factory. Specifically, wiring for lighting features is factory assembled into each panel unit with interconnecting plugs to feed power to lighting features from the designated power supply.

Lighting

The "Ribbon" and "Minimal" designs contain horizontal surfaces. As such, these surfaces are conducive to supporting one or more light fixtures arranged to illuminate the exterior surface of the instant integrated wall assembly. For example, a light fixture can be mounted to the bottom of a horizontal surface and arrange to throw its light in a downward direction to illuminate the horizontal surface, and optionally the adjacent vertical surface, below it. Moreover, each of the "Ribbon", "Minimal" and "Parametric" designs may feature openings that have been cut (e.g., laser cut) into the exterior (outward facing) surface of the wall assembly. An example of such openings is illustrated by lead line 94 in the accompanying FIG. 10 photo of the "Parametric" design. Lighting the space behind the cut openings can provide a dramatic effect. The openings may be in the shape of letters that spell out a message, logo, or name. Lighting may be by way of low voltage light-emitting diodes (LEDs). These are highly energy-efficient devices: not only do they operate at low voltage, they draw very little current, too. As such, the required wiring harnesses for such lights are not bulky, and cabling or armoring of the wires is not required. The wire or wiring harness for LED lights can be strung behind the exterior surface of the instant wall assembly using knock-outs similar to, or even identical to, those described above for the irrigation system.

INDUSTRIAL APPLICABILITY

This integrated wall assembly system of products enables the design professional to accomplish unique three-dimensional architectural wall cladding system creatively and in a cost effective manner. The product features factory-installed internal stiffeners and support elements to achieve the project design loads.

In addition to performing as a signature feature wall with possibilities for lighting, plantings or other functions, this wall system will perform as an exterior rain screen when used with the proper backup system and air vapor barrier (AVB). Product applications that the Applicant envisions include:

1. Architectural screen wall assemblies wall for parking structures or monumental tower features
2. Prominent feature walls on the exterior façade facing the major public elevations; use less expensive ARC WALL rain screen on the less prominent walls in a coordinated finish
3. Demising/privacy walls between residential unit balconies or pool deck/plaza level screen walls
4. Interior lobby spaces in atria or clerestory spaces
5. Exterior/Interior facades for large public spaces: Stadiums, Hotels, Convention Centers, Airports/Transit Centers
6. Public gathering or convocation spaces at facilities of higher education.

The following descriptions are applicable for all of Applicant's solid metal products:

All aluminum "Ribbon", "Minimal" and "Parametric" façade assemblies are created from solid metals with a high percentage of recycled content: post-industrial and post-consumer.
All of these products can be 100% reclaimed and recycled.
All waste materials generated from the production process are scrapped and reclaimed, which goes right back into the production stream.
No plastic resin or composite materials are used, thereby limiting the need for costly and energy consumptive separation of metal from plastic.
No plastic cores or thermoplastic insulations are used; these can be toxic when burned and are often produced from petroleum-based chemicals.
The products high impact resistance for enhanced durability.
The use of plants on an exterior façade will assist in $CO_2$ absorption.
This product design makes an excellent recladding system to reclaim and rejuvenate tired existing buildings. It is easily adapted to add a new thermal layer to make a building more thermally efficient as well.

SUMMARY AND CONCLUSIONS

The Applicant has created a commercial scaled living wall façade system that can be tailored to customized parameters.

The instant wall cladding system provides the ability to integrate fully supported planter boxes with modular irrigation, only where it is needed.

The instant wall cladding system can be integrated with other more generic ARCWALL design systems to create a unified exterior or interior wall surface design, and enabling the design to highlight only those areas of the building where a feature is appropriate without having to introduce a completely different wall cladding system.

The interesting profiles ("Ribbon", "Minimal" or "Parametric") enable the designer to use the three-dimensional features alone as a part of the design palette for the façade to create interesting shading patterns on prominent walls.

The instant wall cladding system provides the ability to integrate lighting features with wiring into fully assembled modular units.

Applicant can offer custom perforations for a unique design or to create internal lighting features.

The wall system is pre-engineered and uses an integrated support system designed for the users' particular project and performance criteria. The supporting elements and attachment methods are flexible and can be adapted to meet virtually any design pressure or climate.

The instant wall cladding system can act as a canvas for the design professional's creative skills and architectural palette for many different materials, colors and textures.

The target market and areas for this product include, but are not limited to:

healthcare
hotel, hospitality, convention & retail
transportation
Class A office
High end multi-family residential
stadium, cultural, museum An artisan of ordinary skill will appreciate that various modifications may be made to the invention herein described without departing from the scope or spirit of the invention as defined in the appended claims.

What is claimed is:

1. An article comprising a cladding system for a wall of a structure, said cladding system comprising:
   (a) a plurality of metal structural members connected together to form a rigid substrate having a front surface, and a rear surface in a spaced-apart relationship and parallel to the font surface;
   (b) an architectural facade for the wall comprising plate metal shaped in three dimensions;
   (c) a plurality of modules, each module of said plurality of modules being of defined height and width, and comprising said architectural facade attached to said rigid substrate, and further comprising means for attachment of said module to the wall; and
   (d) wherein said module of said plurality of modules placed above or below one another, and adjacent one another, form a repeating pattern of said three-dimensionally shaped plate metal of said architectural facade.

2. The article of claim 1, wherein said pattern also repeats in a horizontal direction.

3. The article of claim 1, wherein said attachment to the wall occurs through a plurality of support elements.

4. The article of claim 3, wherein said three-dimensionally shaped plate metal comprises (i) a first flat panel or portion that slopes out or away from said plurality of support elements as one moves vertically down said flat panel, and (ii) a second flat panel or portion that slopes inward or toward said plurality of support elements as one moves vertically down said flat panel.

5. The article of claim 4, wherein at least one of said first or second flat panel or portion tapers in a horizontal direction.

6. The article of claim 4, wherein both of said first and second flat panel or portion taper in a horizontal direction.

7. The article of claim 1, further comprising at least one knock-out or feed-through positioned behind said plate metal for accommodating a pipe or hose for irrigation.

8. The article of claim 7, wherein said at least one knock-out or feed-through is located in at least one of said plurality of structural support elements.

9. The article of claim 7, wherein said knock-out or feed-through also accommodates electrical wiring.

10. The article of claim 9, further comprising at least one length of electrical wiring.

11. The article of claim 10, further comprising at least one electric light.

12. The article of claim 10, wherein said length of electrical wiring further comprises at least one plug for connecting said length of electrical wiring to electrical wiring of an adjacent module.

13. The article of claim 7, further comprising at least one pipe or hose for irrigation.

14. The article of claim 13, wherein said at least one pipe or hose for irrigation comprises a fitting configured for interconnection to an irrigation pipe or hose of an adjacent module.

15. The article of claim 1, wherein said plate metal is solid.

16. The article of claim 1, wherein said pattern is that of a basket weave.

17. The article of claim 1, wherein said pattern is that of a horizontal trough.

18. The article of claim 1, wherein said plate metal comprises a metal selected from the group consisting of aluminum, stainless steel and zinc.

19. The article of claim 1, wherein said plate metal comprises anodized aluminum.

20. The article of claim 1, wherein said three-dimensionally shaped plate metal is coated with a substance selected from the group consisting of paint, polyvinylidene fluoride and polytetrafluoroethylene.

* * * * *